US007941671B2

(12) United States Patent
Wong (10) Patent No.: US 7,941,671 B2
(45) Date of Patent: May 10, 2011

(54) METHOD AND APPARATUS FOR ACCOMMODATING MULTIPLE VERIFIER TYPES WITH LIMITED STORAGE SPACE

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1026 days.

(21) Appl. No.: 10/966,511

(22) Filed: Oct. 14, 2004

(65) Prior Publication Data

US 2006/0085649 A1 Apr. 20, 2006

(51) Int. Cl.
*G06F 21/00* (2006.01)

(52) U.S. Cl. ............... 713/183; 713/184; 726/5; 726/6; 726/7

(58) Field of Classification Search .......... 713/183–184; 726/5–7
See application file for complete search history.

(56) References Cited

U.S. PATENT DOCUMENTS

| 5,091,939 | A | * | 2/1992 | Cole et al. ................ 713/183 |
| 5,204,966 | A | * | 4/1993 | Wittenberg et al. ............ 726/6 |
| 5,751,812 | A | * | 5/1998 | Anderson .................. 713/155 |
| 5,787,169 | A | * | 7/1998 | Eldridge et al. ............ 713/165 |
| 5,887,131 | A | * | 3/1999 | Angelo ..................... 726/20 |
| 6,154,543 | A | * | 11/2000 | Baltzley ................... 380/255 |
| 6,292,895 | B1 | * | 9/2001 | Baltzley ................... 713/168 |
| 6,327,659 | B2 | * | 12/2001 | Boroditsky et al. ......... 713/182 |
| 6,332,192 | B1 | * | 12/2001 | Boroditsky et al. ......... 713/168 |
| 6,360,322 | B1 | * | 3/2002 | Grawrock .................. 713/176 |
| 6,539,479 | B1 | * | 3/2003 | Wu ......................... 713/151 |
| 6,567,794 | B1 | * | 5/2003 | Cordery et al. ............. 705/60 |
| 6,629,246 | B1 | * | 9/2003 | Gadi ......................... 726/8 |
| 6,944,296 | B1 | * | 9/2005 | Liu et al. .................. 380/201 |
| 6,996,719 | B2 | * | 2/2006 | Riordan .................... 713/184 |
| 7,006,673 | B2 | * | 2/2006 | Hamid ...................... 382/124 |
| 7,047,408 | B1 | * | 5/2006 | Boyko et al. ............... 713/169 |
| 7,058,180 | B2 | * | 6/2006 | Ferchichi et al. ........... 380/247 |
| 7,062,570 | B2 | * | 6/2006 | Hong et al. ................ 709/238 |
| 7,100,207 | B1 | * | 8/2006 | Prager ...................... 726/27 |
| 7,103,912 | B2 | * | 9/2006 | Xia et al. ................... 726/8 |
| 7,140,036 | B2 | * | 11/2006 | Bhagavatula et al. .......... 726/2 |
| 7,187,771 | B1 | * | 3/2007 | Dickinson et al. .......... 380/228 |
| 7,272,231 | B2 | * | 9/2007 | Jonas et al. ............... 380/281 |
| 7,275,258 | B2 | * | 9/2007 | Arbab et al. ................ 726/6 |
| 2002/0029341 | A1 | * | 3/2002 | Juels et al. ................ 713/184 |
| 2002/0073309 | A1 | * | 6/2002 | Kurn et al. ................ 713/155 |
| 2002/0138728 | A1 | * | 9/2002 | Parfenov et al. ........... 713/170 |

(Continued)

OTHER PUBLICATIONS

Practical UNIX & Internet Security by Simson Garfinkel & Gene Spafford; ISBN 1-56592-148-8, 1004 pages. Second Edition, Apr. 1996.*
crypt.c, 4.2; Berkeley Jul. 9, 1981.*
http://www.psynch.com/retrieved from archive.org: dated Jun. 3, 2004.*
Linux Security HOWTO Kevin Fenzi & Dave Wreski v2.0, Jun. 11, 2002 retrieved from archive.org: dated Apr. 2, 2003.*

*Primary Examiner* — Christian LaForgia
*Assistant Examiner* — James Turchen
(74) *Attorney, Agent, or Firm* — Park, Vaughan & Fleming LLP; Shun Yao (57) ABSTRACT

One embodiment of the present invention provides a system that accommodates different types of verifiers in a computer system. During operation, the system receives a username and a password. The system then computes a verifier based on the password. If the size of the verifier exceeds a storage limit, the system transforms the verifier into a transformed verifier which conforms to the storage limit, thereby allowing the computer system to compare the transformed verifier with a locally stored verifier associated with the username to facilitate user authentication.

21 Claims, 6 Drawing Sheets

U.S. PATENT DOCUMENTS

| | | | |
|---|---|---|---|
| 2003/0005299 A1* | 1/2003 | Xia et al. | 713/171 |
| 2003/0163738 A1* | 8/2003 | Couillard | 713/202 |
| 2003/0204724 A1* | 10/2003 | Ayyagari et al. | 713/168 |
| 2004/0019786 A1* | 1/2004 | Zorn et al. | 713/168 |
| 2004/0025026 A1* | 2/2004 | Karp et al. | 713/183 |
| 2005/0114673 A1* | 5/2005 | Raikar et al. | 713/182 |

* cited by examiner

METHOD AND APPARATUS FOR ACCOMMODATING MULTIPLE VERIFIER TYPES WITH LIMITED STORAGE SPACE

BACKGROUND

1. Field of the Invention

The present invention relates to techniques for authenticating a user in a computer system. More specifically, the present invention relates to a method and an apparatus for accommodating different verifier types for passwords in a computer system which provides only limited storage space for each verifier.

2. Related Art

One of the key enabling features in a multi-user computer system is the security/password mechanism, which allows a user to specify an alphanumeric password for authentication purposes. However, for security reasons, a user's password is normally not stored in the computer system in "plain text" format. Some computer systems perform a one-way hash function on a user's password to obtain a corresponding verifier (hash value), which is stored locally on the computer system. Because it is easy to compute the verifier based on a password, but very difficult to derive the password from a verifier, it is more secure to store and compare the verifiers during a user-authentication process.

In general, a hash function takes a variable-length input string and computes a fixed-length verifier. Legacy computer systems usually allocate fixed-size storage space to store each verifier. This limited storage space becomes a problem with the emergence of more sophisticated hash functions, which produce larger-size verifiers which may not fit in the limited storage space. The inability to accommodate larger-size verifier types is particularly troublesome in legacy computer systems running mission-critical database applications. This is because it is usually difficult to substantially change the underlying operating system of the legacy computer system without affecting the operation of the database application.

Hence, what is needed is a method and an apparatus for accommodating different verifier types in a computer system which allocates only limited storage space for each verifier.

SUMMARY

One embodiment of the present invention provides a system that accommodates different types of verifiers in a computer system. During operation, the system receives a username and a password. The system then computes a verifier based on the password. If the size of the verifier exceeds a storage limit, the system transforms the verifier into a transformed verifier which conforms to the storage limit, thereby allowing the computer system to compare the transformed verifier with a locally stored verifier associated with the username to facilitate user authentication.

In a variation of this embodiment, transforming the received verifier into a transformed verifier involves truncating the received verifier so that the size of the truncated verifier conforms to the storage limit.

In a variation of this embodiment, the system looks up a verifier type associated with the username, and returns the verifier type, subsequent to receiving the username.

In a further variation, computing a verifier based on the password involves performing a hash function on the password based on the verifier type.

In a variation of this embodiment, the system communicates the username to the computer system and receives a verifier type associated with the username from the computer system, subsequent to receiving the username.

In a further variation, computing a verifier based on the password involves performing a hash function on the password based on the received verifier type.

In a variation of this embodiment, the system receives a request to add a new user. The system also receives a username and a password for the new user. The system then generates a verifier based on the password for the new user, wherein the size of the generated verifier conforms to the storage limit imposed by the computer system.

In a further variation, the system stores the username and the generated verifier for the new user in the computer system.

In a further variation, generating the verifier based on the password for the new user involves: receiving a verifier type for the new user; performing a hash function on the password based on the verifier type to produce the verifier; and if the size of the verifier does not conform to the storage limit, transforming the verifier into a transformed verifier which conforms to the storage limit.

In a further variation, transforming the verifier into a transformed verifier involves truncating the verifier so that the size of the truncated verifier conforms to the storage limit.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

User Authentication System

Figure 1:
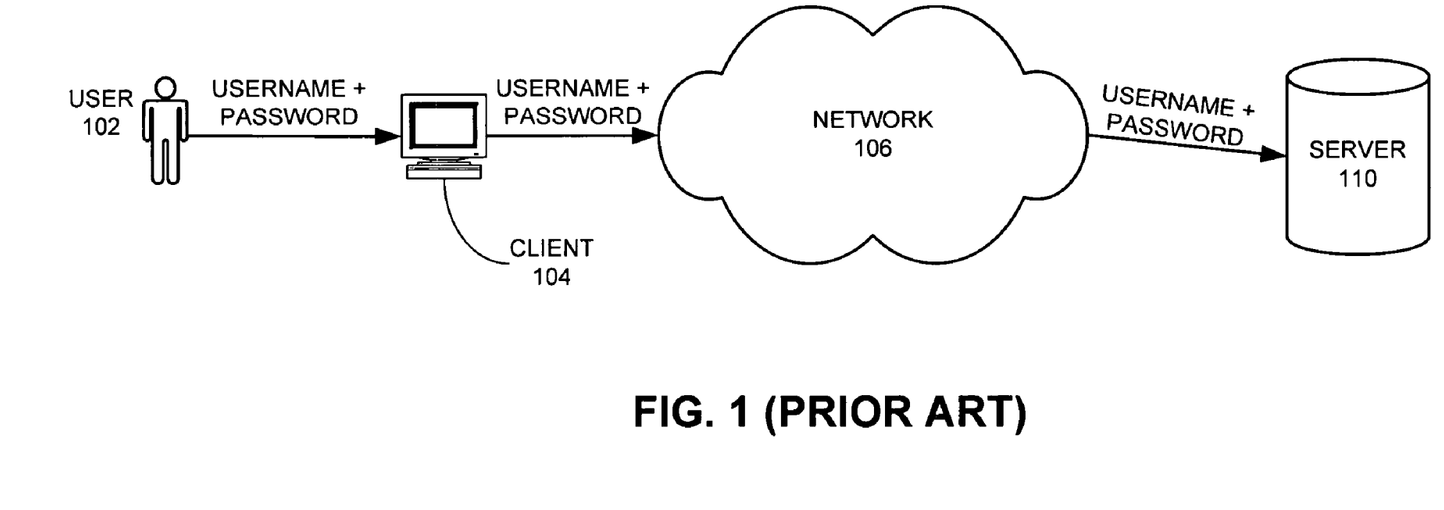
FIG. 1 illustrates a server and a client which allow a user to remotely log on over a network (prior art).

FIG. 1 illustrates a server and a client which allow a user to remotely log on over a network (prior art). As shown in FIG. 1, a client 104 can communicate with a server 110 over a network 106. Note that network 106 may be any type of network, e.g., the Internet, a local area network (LAN), a virtual private network (VPN) connection, or simply a network cable connecting client 104 and server 110.

During a log-in process, a user 102 may input his username and password to client 104, which allows user 102 to log on server 110 remotely. Typically, client 104 faithfully transmits user inputs to, and receives responses from server 110. However, conventional client programs, such as TELNET, transmit user key strokes in plain text to the server. This is obviously a very insecure form of communication, especially when network 106 is a public network. Ideally, client 104 and server 110 implement a secure communication protocol, such as the secure shell (SSH) protocol, to ensure an encrypted, secure communication channel over network 106.

When the username and password arrive at server 110, the password is typically fed into a hash function, which produces a corresponding verifier. Server 110 subsequently compares the computed verifier with a locally stored verifier associated with the username. If the two match, the user is authenticated and is granted access to server 110.

Note that, in conventional computer systems, the hash function type (verifier type) is pre-determined, and the verifier produced by the hash function has a fixed size. Consequently, conventional computer systems typically assign a fixed storage space for each verifier. This approach, although acceptable in legacy computer systems, may not be suitable for users who wish to use more sophisticated verifier types which produce larger-size verifiers. To accommodate such needs, it may be necessary to substantially modify the existing operating system to allow larger storage spaces for verifiers. However, modifying an operating system is nontrivial, and can be extremely disruptive if the computer system is running a mission-critical database application.

Transforming Verifiers to Accommodate Different Verifier Types

One way to solve the problem described above, is to transform a larger-size, non-conforming verifier so that it conforms with the storage limit imposed by a computer system. By transforming non-conforming verifiers into conforming verifiers, a computer system can accommodate different types of verifiers. Furthermore, a user or a system administrator can enjoy the flexibility of selecting a particular verifier type.

Figure 2A:
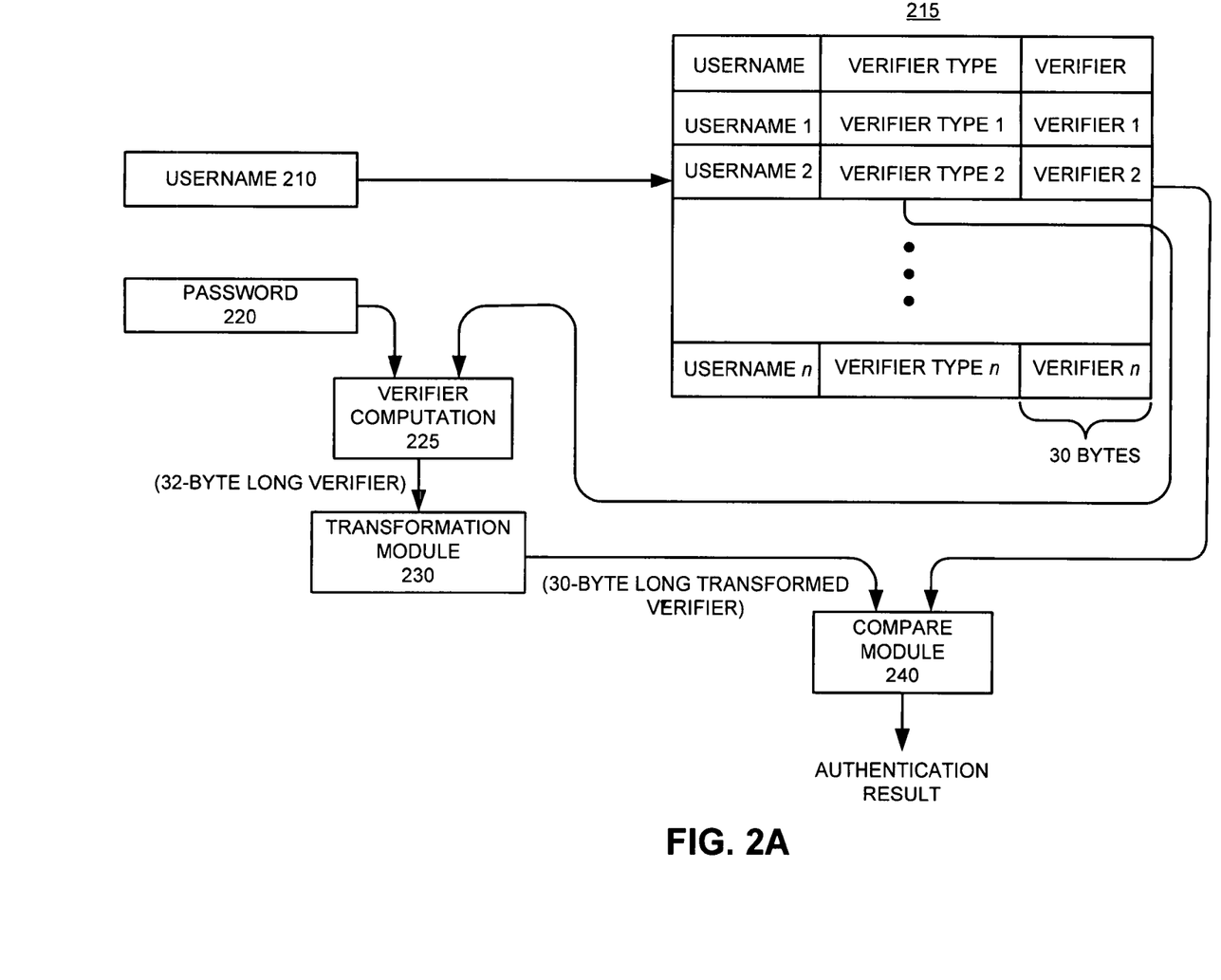
FIG. 2A illustrates the process of transforming a verifier to accommodate different verifier types in accordance with an embodiment of the present invention.

FIG. 2A illustrates the process of transforming a verifier to accommodate different verifier types in accordance with an embodiment of the present invention. As shown in FIG. 2A, after receiving a username 210 and a password 220, the computer system performs a lookup into a mapping table 215 to search for a verifier type associated with username 210 (which in this example are verifier type 2). Note that, in this example, the computer system provides 30 bytes to store every verifier.

Based on the associated verifier type 2 and the received password 220, a verifier computation module 225 selects a hash function and computes a verifier, which in this example happens to be 32 bytes long. This 32-byte long verifier then enters a transformation module 230, which transforms the 32-byte long verifier into a 30-byte long transformed verifier. Note that transform model 230 may use any method to transform an arbitrarily long verifier into a conforming verifier. One simple transformation method is to truncate a larger-size verifier to conform to the storage limit. In this example, the 32-byte long verifier can be truncated to be 30 bytes long. In addition, transformation module 230 may determine when a verifier computed by computation module 225 needs to be transformed. If a verifier is exactly 30-byte long, transformation module 230 may not have to perform any operation on the verifier.

Next, the transformed verifier and the locally stored verifier 2 which is associated with username 2 and which is obtained from mapping table 215 are sent to a comparison module 240. Comparison module 240 compares the two verifiers, and produces an authentication result. If the two verifiers are identical, the user is authenticated. Otherwise, the user is denied access to the computer system. Note that although mapping table 215 includes the usernames, verifier types, and verifiers, the user-verifier mapping table and the user-verifier type mapping table may be located separately in different physical storage space.

Although FIG. 2A illustrates an example where verifier computation is performed by the computer system which also stores the usernames, verifier types, and verifiers, it is possible for a remote client to perform verifier computation. When a user attempts to log in through a remote client, the client can first transmit the username to the computer system where the user information is stored (the server). Upon receiving the username, the server responds to the client with the verifier type associated with the username. Based on the received verifier type, the client then selects the proper hash function, computes the verifier accordingly, and sends the verifier to the server. In this way, the client can avoid sending a user's password over a network to the server by sending only the verifier.

Figure 2B:
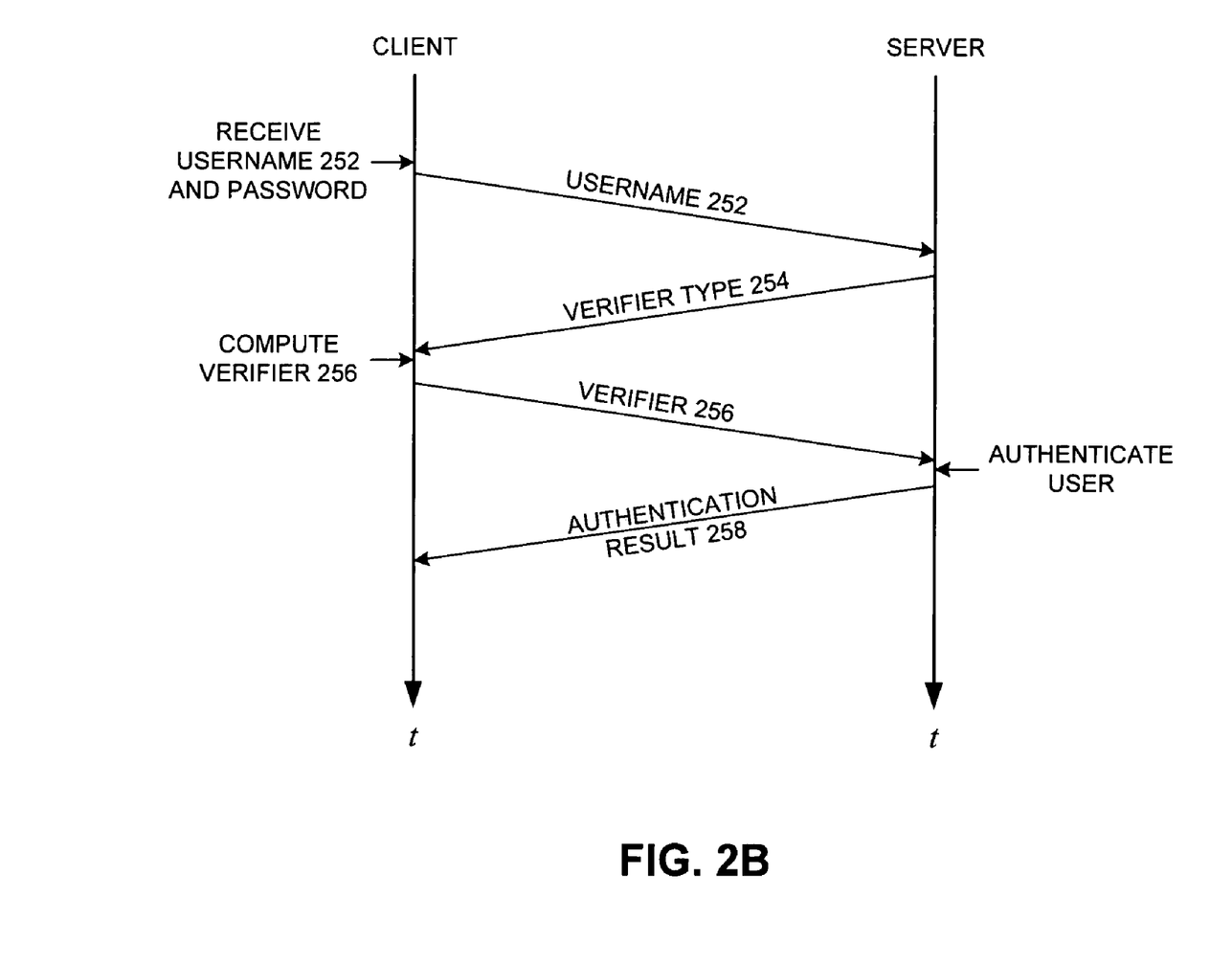
FIG. 2B presents a time-space diagram illustrating a client-server handshake process in accordance with an embodiment of the present invention.

FIG. 2B presents a time-space diagram illustrating a client-server handshake process in accordance with an embodiment of the present invention. As shown in FIG. 2B, a client first receives a username 252 and the corresponding password from a user attempting to log on to the server. The client then transmits username 252 to the server. The server in turn returns verifier type 254 which is associated with username 252. The client then computes a verifier 256 based on verifier type 254 and the user's password. The client also performs the necessary transformation (e.g., truncation) of the verifier if it does not conform to a storage limit imposed by the server. Next, the client transmits verifier 256 to the server. The server subsequently authenticates the user by comparing verifier 256 with a locally stored verifier associated with username 252. The server then transmits an authentication result 258 to the client.

Figure 3A:
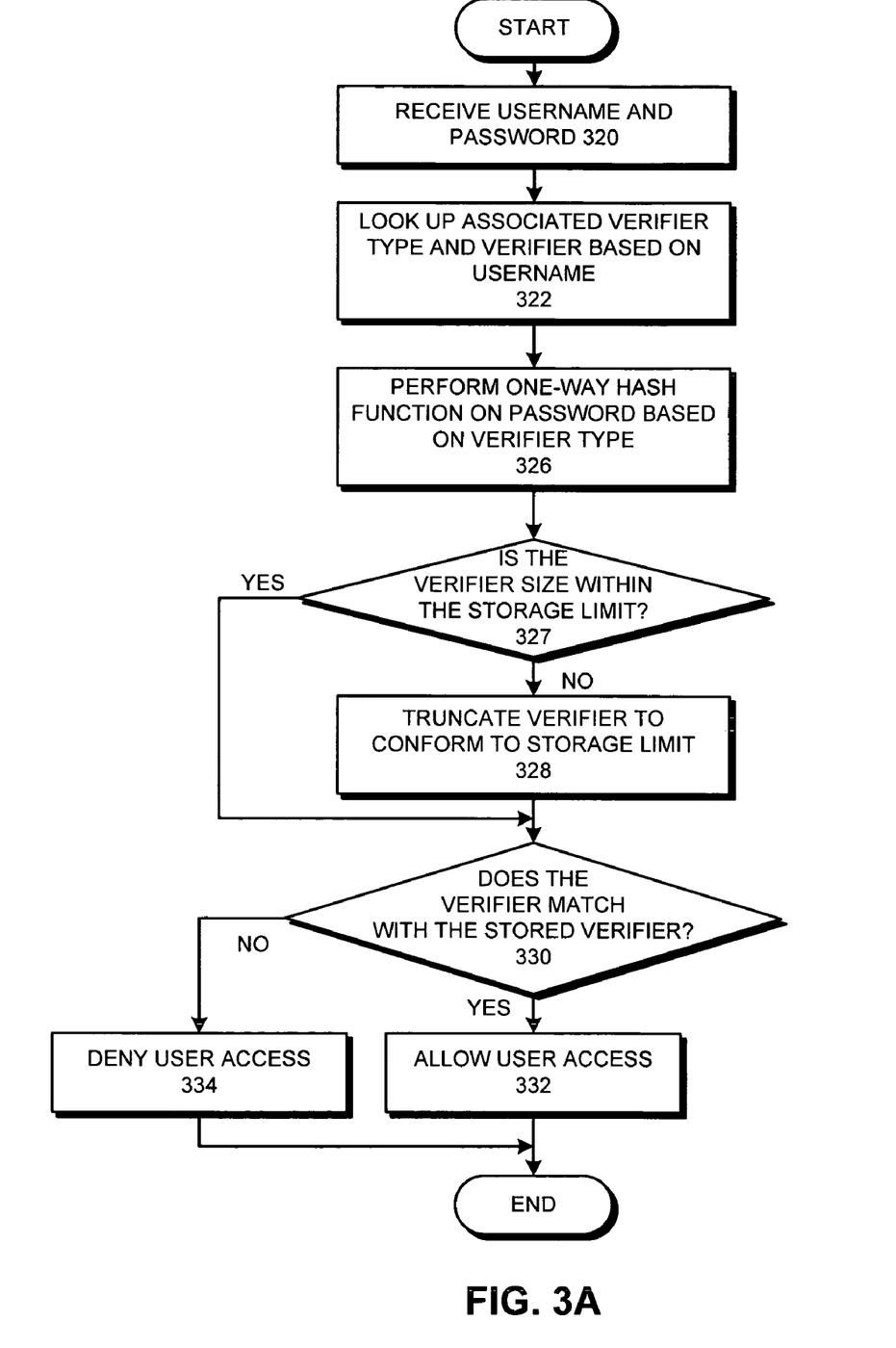
FIG. 3A presents a flow chart illustrating the process of computing a verifier at a server to conform to a storage limit in accordance with an embodiment of the present invention.

FIG. 3A presents a flow chart illustrating the process of computing a verifier at a server to conform to a storage limit in accordance with an embodiment of the present invention. The system starts by receiving a username and a password (step 320). The system then looks up a verifier type and a verifier associated with the received username (step 322). Next, the system performs a one-way hash function on the received password based on the verifier type associated with the received username (step 326).

The system subsequently determines whether the size of the computed verifier is within the storage limit (step 327). If not, the system truncates the computed verifier so that the size of the truncated verifier conforms to the storage limit (step 328). Otherwise, the system proceeds to determine whether the verifier (or the truncated verifier if the verifier is truncated) matches the locally stored verifier associated with the received username (step 330). If so, the user is allowed access to the computer system (step 332). Otherwise, the user is denied access (step 334).

Figure 3B:
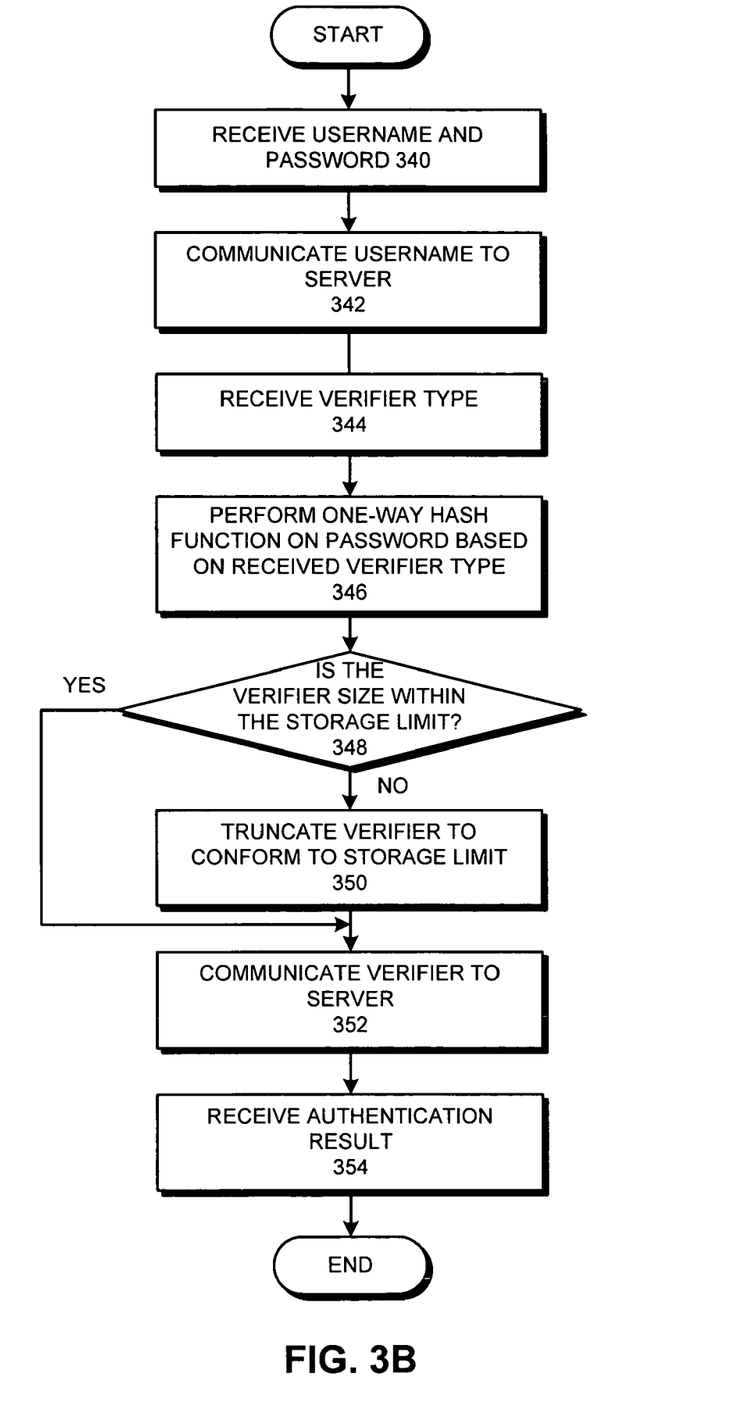
FIG. 3B presents a flow chart illustrating the process of computing a verifier at a client to conform to a storage limit in accordance with an embodiment of the present invention

FIG. 3B presents a flow chart illustrating the process of computing a verifier at a client to conform to a storage limit in accordance with an embodiment of the present invention. The system starts by receiving a username and a password (step 340). The system then communicates the username to the server (step 342) and receives a verifier type associated with the username from the server (step 344). The system then performs a one-way hash function on the password based on the received verifier type associated with the received username (step 346).

The system subsequently determines whether the size of the computed verifier is within the storage limit (step 348). If not, the system truncates the computed verifier so that the size of the truncated verifier conforms to the storage limit (step 350). Otherwise, the system proceeds to communicate the verifier to the server (step 352). The system then receives the authentication result from the server (step 354).

Figure 4:
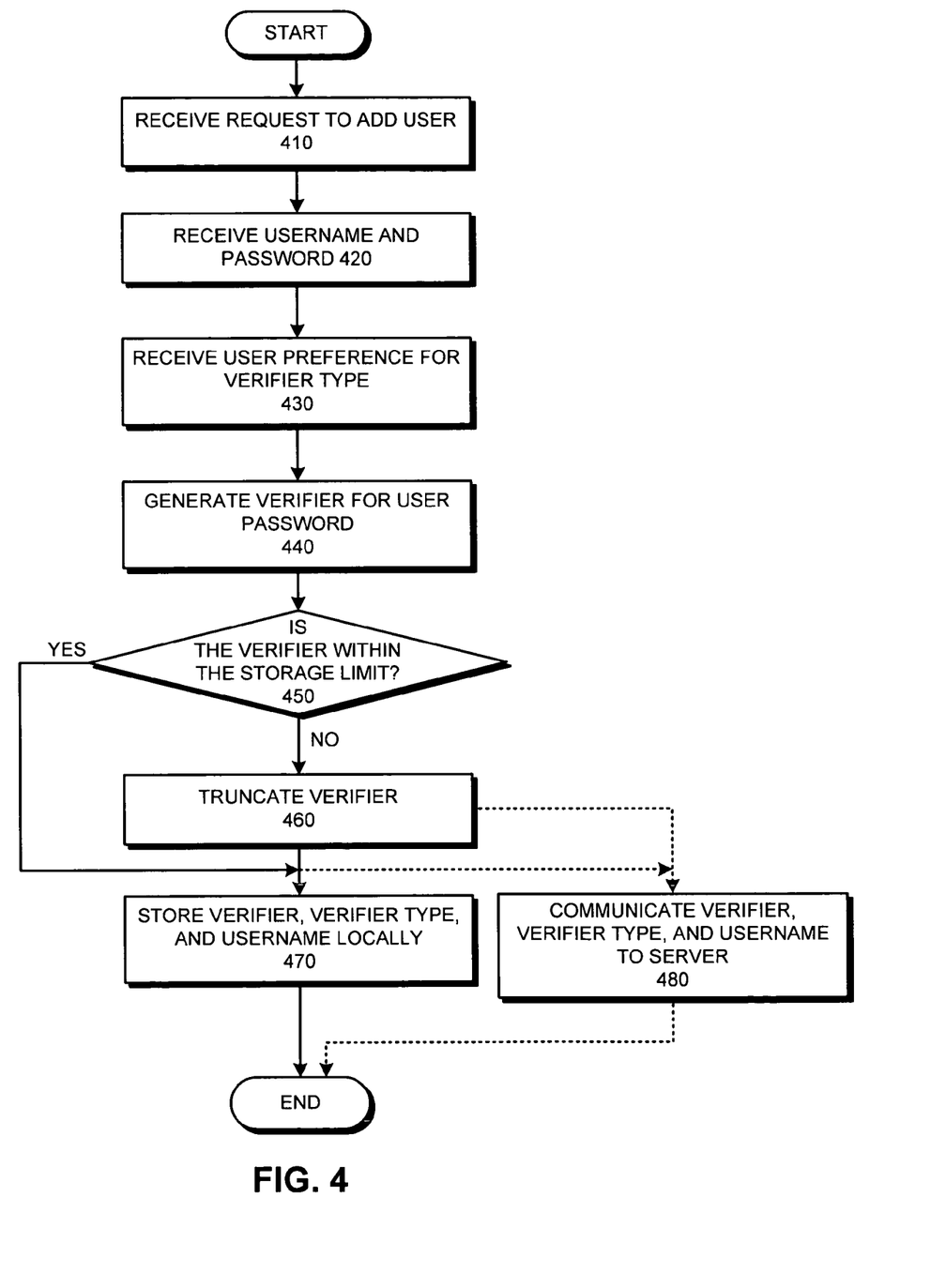
FIG. 4 presents a flow chart illustrating the process of adding a new user and storing the corresponding verifier for the new user in accordance with an embodiment of the present invention.

The capability of accommodating different verifier types also allows a computer system to offer different verifier types to a newly added user. FIG. 4 presents a flow chart illustrating the process of adding a new user and storing the corresponding verifier for the new user in accordance with an embodiment of the present invention. The system starts by receiving a request to add a user (step 410). The system then receives the username and password for the new user (step 420). Next, the system receives the user preference for a verifier type and determines the corresponding hash function (step 430). The system subsequently generates a verifier for the received user password based on the verifier type (step 440).

After generating the verifier, the system determines whether the verifier is within the storage limit imposed by the computer system (step 450). If not, the system truncates the generated verifier before storing it so that its size conforms to the storage limit (460).

If the verifier computation is performed by a server (i.e., the system is on the server side), the system stores the verifier, the verifier type, and the username locally (step 470). If the verifier computation is performed by a client (i.e., the system is on the client side), the system then communicates the verifier, verifier type, and username associated with the new user to the server (step 480).

Note that, although the description above is made in a client-server context, the same principles apply in a stand-alone system, wherein a user may directly log in the computer system which stores the usernames and verifiers.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accommodating different types of verifiers in a computer system, the method comprising:
    allowing a user to select a verifier type, wherein different usernames are associated with different verifier types;
    receiving a username and a password;
    identifying a hash function based on the verifier type associated with the username;
    performing the hash function on the password to compute a verifier, wherein different verifier types correspond to different hash functions, and different verifier sizes;
    determining whether the size of the computed verifier is within a storage limit for storing verifiers imposed by the computer system;
    if the size of the computed verifier exceeds the storage limit, truncating the computed verifier into a truncated verifier which conforms to the storage limit; and
    comparing the truncated verifier with a locally stored verifier associated with the username to facilitate user authentication.

2. The method of claim 1, wherein identifying the hash function comprises:
    looking up the verifier type associated with the username in a locally stored lookup table.

3. The method of claim 1, wherein identifying the hash function comprises:
    communicating the username to a remote server; and
    receiving from the remote server a verifier type associated with the username.

4. The method of claim 3, further comprising comparing the truncated verifier with the stored verifier by:
    communicating the verifier to the remote server; and
    receiving the authentication result from the remote server.

5. The method of claim 1, further comprising:
    receiving a request to add a new user;
    receiving a username and a password for the new user; and
    generating a verifier based on the password for the new user, wherein the size of the generated verifier conforms to the storage limit imposed by the computer system.

6. The method of claim 5, further comprising storing the username and the generated verifier for the new user in the computer system.

7. The method of claim 5, wherein generating the verifier based on the password for the new user involves:
    receiving a verifier type for the new user;
    performing a hash function on the password based on the verifier type to produce the verifier; and
    if the size of the verifier does not conform to the storage limit, truncating the verifier into a truncated verifier which conforms to the storage limit.

8. A computer-readable storage medium storing instructions that when executed by a computer cause the computer to perform a method for accommodating different types of verifiers in a computer system, the method comprising:
    allowing a user to select a verifier type, wherein different usernames are associated with different verifier types;
    receiving a username and a password;
    identifying a hash function based on the verifier type associated with the username; and
    performing the hash function on the password to compute a verifier, wherein different verifier types correspond to different hash functions, and different verifier sizes;
    determining whether the size of the computed verifier is within a storage limit for storing verifiers imposed by the computer system;
    if the size of the computed verifier exceeds the storage limit, truncating the computed verifier into a truncated verifier which conforms to the storage limit; and
    comparing the truncated verifier with a locally stored verifier associated with the username to facilitate user authentication.

9. The computer-readable storage medium of claim 8, wherein identifying the hash function comprises:
    looking up the verifier type associated with the username in a locally stored lookup table.

10. The computer-readable storage medium of claim 8, wherein identifying the hash function comprises:
    communicating the username to a remote server; and receiving from the remote server a verifier type associated with the username.

11. The computer-readable storage medium of claim 10, wherein the method further comprises comparing the truncated verifier with the stored verifier by:
communicating the verifier to the remote server; and
receiving the authentication result from the remote server.

12. The computer-readable storage medium of claim 8, wherein the method further comprises:
receiving a request to add a new user;
receiving a username and a password for the new user; and
generating a verifier based on the password for the new user, wherein the size of the generated verifier conforms to the storage limit imposed by the computer system.

13. The method of claim 12, further comprising storing the username and the generated verifier for the new user in the computer system.

14. The computer-readable storage medium of claim 12, wherein generating the verifier based on the password for the new user involves:
receiving a verifier type for the new user;
performing a hash function on the password based on the verifier type to produce the verifier; and
if the size of the verifier does not conform to the storage limit, truncating the verifier into a truncated verifier which conforms to the storage limit.

15. An apparatus for accommodating different types of verifiers in a computer system, comprising:
a selection mechanism configured to allow a user to select a verifier type, wherein different usernames are associated with different verifier types;
a receiving mechanism configured to receive a username and a password;
a computation mechanism configured to identify a hash function based on the verifier type associated with the username, and to perform the hash function on the password to compute a verifier, wherein different verifier types correspond to different hash functions, and different verifier sizes;
a determination mechanism configured to determine whether the size of the computed verifier is within a storage limit for storing verifiers imposed by the computer system;
a transformation mechanism, wherein if the size of the computed verifier exceeds the storage limit, the transformation mechanism is configured to truncate the computed verifier into a truncated verifier which conforms to the storage limit; and
a comparison mechanism configured to compare the truncated verifier with a locally stored verifier associated with the username to facilitate user authentication.

16. The apparatus of claim 15, further comprising a lookup mechanism, wherein subsequent to the receiving of the username, the lookup mechanism is configure to:
look up the verifier type associated with the username in a locally stored lookup table.

17. The apparatus of claim 15, further comprising a communication mechanism, wherein subsequent to the receiving of the username, the communication mechanism is configured to:
communicate the username to a remote server; and
receiving from a remote server a verifier type associated with the username.

18. The apparatus of claim 17, wherein the comparison mechanism is further configured to compare the truncated verifier with the stored verifier by:
communicating the verifier to the remote server; and
receiving the authentication result from the remote server.

19. The apparatus of claim 15,
wherein the receiving mechanism is configured to receive a request to add a new user, and to receive a username and a password for the new user; and
wherein the computation mechanism is configured to compute a verifier based on the password for the new user.

20. The apparatus of claim 19, further comprising a storage mechanism configured to store the username and the generated verifier for the new user in the computer system.

21. The apparatus of claim 19, wherein while computing the verifier based on the password for the new user, the computation mechanism is configured to:
receive a verifier type for the new user; and
to perform a hash function on the password based on the verifier type to produce the verifier; and
wherein if the size of the verifier does not conform to the storage limit, the transformation mechanism is configured to truncate the verifier into a truncated verifier which conforms to the storage limit.

* * * * *

UNITED STATES PATENT AND TRADEMARK OFFICE
CERTIFICATE OF CORRECTION

| | | |
|---|---|---|
| PATENT NO. | : 7,941,671 B2 | |
| APPLICATION NO. | : 10/966511 | |
| DATED | : May 10, 2011 | |
| INVENTOR(S) | : Wong | |

It is certified that error appears in the above-identified patent and that said Letters Patent is hereby corrected as shown below:

On column 6, line 48, In Claim 8, after "username;" delete "and".

Signed and Sealed this
Eleventh Day of October, 2011

David J. Kappos
*Director of the United States Patent and Trademark Office*